May 12, 1970     F. L. MURDOCK     3,510,978
FISH-ATTRACTING DEVICE
Filed July 31, 1968     2 Sheets-Sheet 1
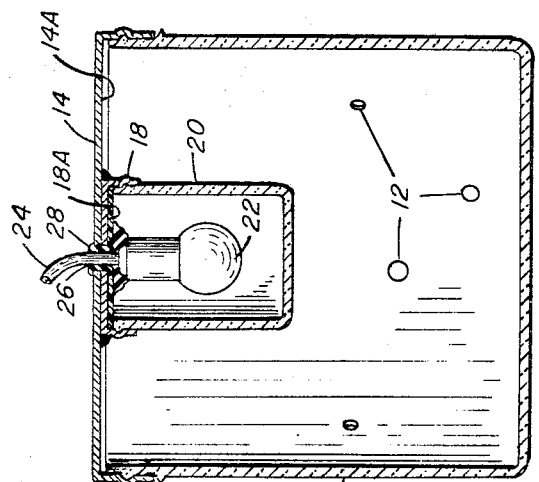
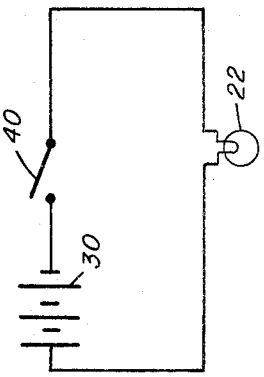
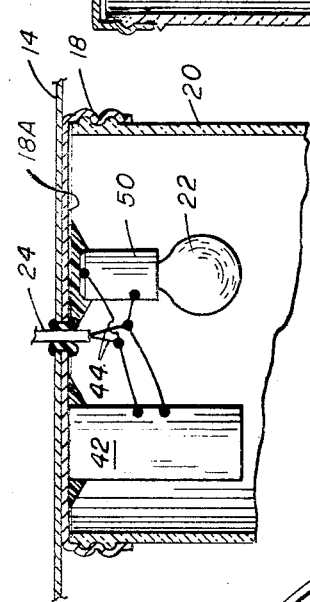
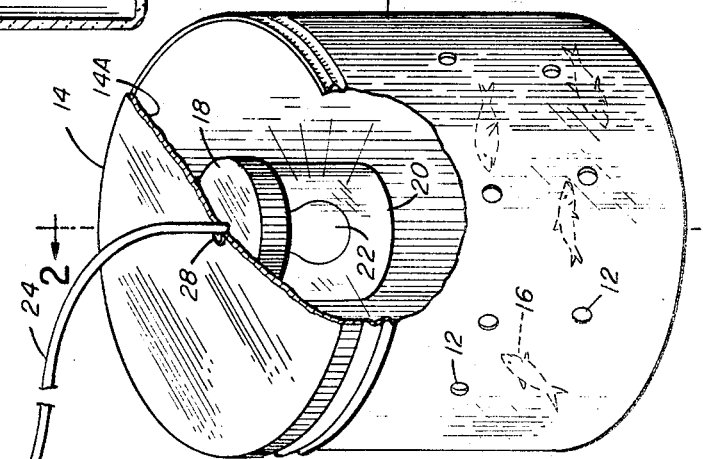
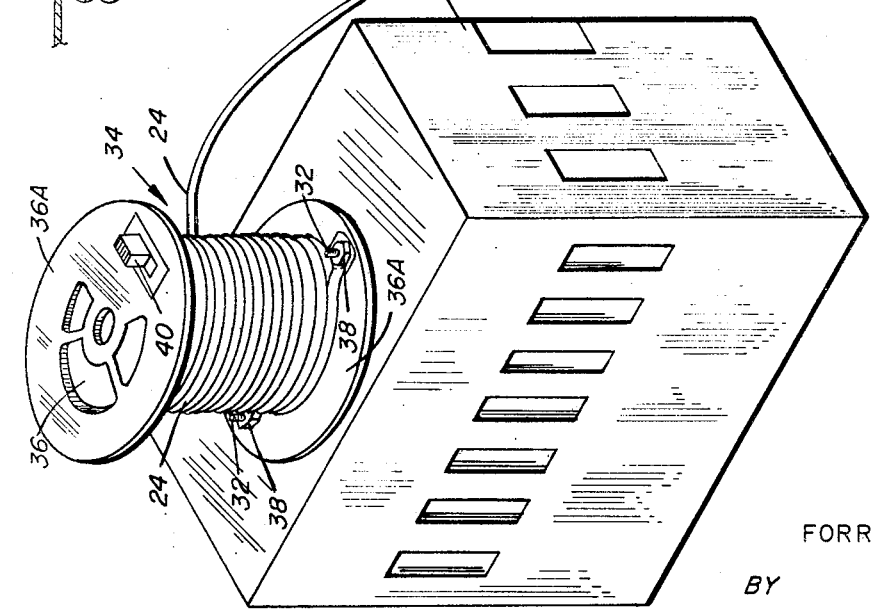
INVENTOR.
FORREST L. MURDOCK
BY
*Head & Johnson*
ATTORNEYS May 12, 1970 F. L. MURDOCK 3,510,978
FISH-ATTRACTING DEVICE Filed July 31, 1968 2 Sheets-Sheet 2

INVENTOR.
FORREST L. MURDOCK
BY
*Head & Johnson*
ATTORNEYS

United States Patent Office 3,510,978
Patented May 12, 1970

3,510,978
FISH-ATTRACTING DEVICE
Forrest Lee Murdock, 2420 E. 24th St.,
Tulsa, Okla. 74114
Filed July 31, 1968, Ser. No. 749,152
Int. Cl. A01k 75/02, 97/04, 79/00
U.S. Cl. 43—17.1      9 Claims

ABSTRACT OF THE DISCLOSURE

A fish-attracting device including a transparent container having holes therein permitting circulation of water therethrough, the container being adapted to include minnows, and having a removable lid, an electrically energizable light bulb supported to the interior of the lid, a cable extending from the lid and connected to the bulb, the container being adaptable to be lowered into a body of water, and a battery at the surface to which the cable is attached to illuminate the bulb and thereby the minnows therein for attracting fish.

BACKGROUND AND SUMMARY

Much fishing is done at night. The problem is to attract fish to the area wherein the fisherman is located. When fishing during the daytime fish can naturally see a distance in the water and can be visually attracted to bait placed in the water. At night, however, the distance fish can see is drastically reduced, and therefore, night fishermen depend primarily on the odor of the bait to attract fish.

This invention provides an arrangement for illuminating natural bait, preferably minnows. The invention attracts fish in two ways. That is, first by the light itself which is positioned in the water, and second, by the illuminated appearance of bait, such as minnows.

The invention is characterized by the extreme simplicity, economy, and portability.

It is therefore an object of the invention to provide a fish-attracting device including an arrangement for providing illumination, the device adaptable to be lowered in the water in the area to be fished.

More particularly, an object of this invention is to provide a fish-attracting device including an arrangement for illuminating bait, the device being lowered into the water to be fished, including facilities for illuminating natural bait, such as minnows.

Still more particularly, the invention relates to a fish-attracting device characterized by extreme simplicity and economy of construction.

An important portion of the invention includes means for storing a cable utilized to provide electrical energy from a battery source above the water level to the underwater illumination device.

These and other objects will be better understood by referring to the description and claims taken in conjunction with the attached drawings.

DESCRIPTION OF THE VIEWS

FIG. 1 is an isometric view of an embodiment of the fishing device of this invention, shown partially cut away, and showing a battery and a reel for holding cable, a cable extending to a container, and means of illuminating the container. The container is adapted to receive bait, such as minnows, therein.

FIG. 2 is a cross-sectional view of the transparent container taken along the line 2—2 of FIG. 1.

FIG. 3 is a wiring diagram showing the arrangement of electrical components of the invention.

FIG. 4 is a partial cross-sectional view taken of the upper portion of the transparent inner container showing an alternate embodiment including a sound-generating device for attracting fish.

DETAILED DESCRIPTION

Figure 5:
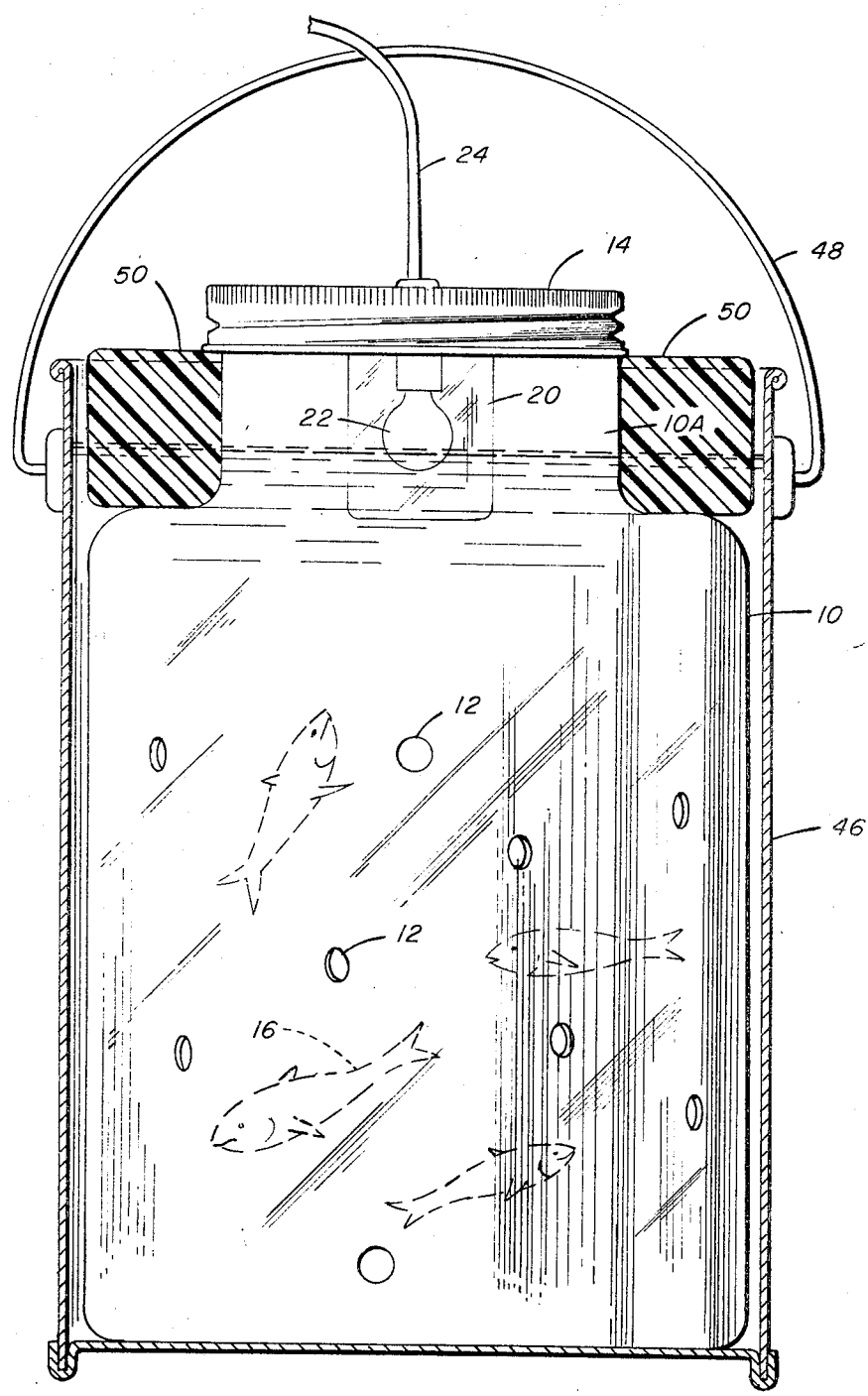
FIG. 5 is a cross-sectional view of a still different alternate embodiment showing means whereby the fish-attracting device may be combined in the form of a minnow bucket.

Referring now to the drawings, and first to FIGS. 1 and 2, the basic invention is illustrated. The fish-attracting device includes a transparent container 10 having openings 12 therein to permit water to circulate therethrough. The container 10 is closed at the bottom and open at the top, the top opening being closed by a removable lid 14. By removing the lid 14 artificial bait, such as minnows 16, may be placed into or removed from the container.

Supported to the underneath side of lid 14 is an inner threaded lid 18. The inner lid 18 may be affixed to the lower surface 14A of lid 14 such as by means of soldering, the use of epoxy resin, riveting, or the like.

Inner lid 18 threadably receives a transparent inner container 20. Affixed to the lower surface 18A of inner lid 18 is a light bulb 22. A cable 24, including electrical conductors, attaches to the light bulb 22 and extends through openings 26 in inner lid 18 and outer lid 14. A grommet 28 is provided to seal openings 26. Thus, when inner container 20 is threaded into inner lid 18 a waterproof arrangement is provided so that bulb 22 is kept dry.

Cable 24 extends to connect to a battery 30. Battery 30 includes upstanding threaded connectors 32. In the preferred arrangement a reel 34 is provided to receive cable 24 as a means of storing the cable. The reel 34 includes a cylindrical portion 36 and a flat larger diameter flange portion 36A at each end. One of the flange portions is provided with openings which receive the upstanding battery connectors 32. Nuts 38 secure the reel 34 to battery 30. Conductors from cable 24 connect to each of the upstanding battery connectors 32 and are held in electrical contact by nuts 38 so that electrical energy is provided to light bulb 22. A further feature includes a switch 40 supported to the reel flange opposite the flange which receives the battery connectors. Switch 40 is in series with one of the conductors making up cable 24, as shown in the wiring diagram of FIG. 3, so that the light bulb 22 may be illuminated as desired.

When a fisherman desires to utilize the device of this invention container 10 is unscrewed from lid 14 and bait placed in the container. The bait is preferably in the form of a natural bait, such as minnows, although the minnows may be either alive or artificial. If artificial minnows are utilized they may be mounted within the container 10 such as on the end of wires (not shown) so that they will appear to be in the attitude of live minnows. After the bait is placed in container 10, lid 14 is screwed into position and the container 10 may then be lowered as deep as desired by means of cable 24 unwound from reel 34. With switch 40 turned on, light bulb 22 is energized casting a light in the water. The light itself serves to attract fish. The appearance of natural bait in the form of the minnows or the like further attracts fish. With the use of live minnows swimming around in the lighted container the attraction of fish is increased. Since fresh water can circulate freely through container 10 by means of holes 22 live minnows will stay alive indefinitely.

Reel 34 may be detached from a used battery by removing nuts 32 and placed onto a new battery.

Container 10 may be of glass or plastic, as long as such is transparent, with plastic being preferred because it is lighter and non-breakable. The same applies to the inner container 20 although the breakability of the smaller inner container is of less significance.

FIG. 4 shows an alternate arrangement wherein there is mounted within the confines of inner container 20 and attached to the lower surface 18A of the inner lid, a sound-generating device 42. Conductors 44 of cable 24 are connected in parallel between a light bulb 22 and the sound-generating device 42. Thus, when switch 40 is closed not only is illumination provided to attract fish but also the sound-generating device 42 is actuated. Sound is very effectively transmitted from the sound-generating device 42 through inner lid 18 and outer lid 14 to the water being fished. It has been learned that sound in the range of between 160 and 610 cycles per second is most effective in attracting fish.

FIG. 5 shows still an additional alternate embodiment of the invention. In this arrangement transparent container 10 is of a larger size including a reduced diameter neck portion 10A which threadably receives outer lid 14. A bucket 46 is provided of a size to easily receive the container 10. Whereas container 10 includes openings 12 permitting free flow of water therethrough, bucket 46 is watertight. The bucket is provided with a bail 48. Thus, with bucket 46 filled with water and container 10 placed therein the device may be utilized as a minnow bucket for the transportation of minnows from one place to another. When the fisherman arrives at the place he wishes to fish he merely removes the inner container 10 from out of the bucket 46 and lowers it into the water. He may remove a portion of the minnows contained therein to use for bait before lowering the container 10 containing the balance of the minnows for attracting fish. Thus by the arrangement of FIG. 5 a combination minnow bucket and fish-attracting device is provided.

As shown in FIG. 2, the bulb 22 may be mounted directly to the underneath side 18A of inner lid 18. However, in the preferred arrangement, as shown in FIG. 4, a socket 50 is mounted to lid 18 so that bulb 22 can be easily removed and replaced if it burns out.

Cable 24 includes conductors 44, as shown in FIG. 4, and in addition may include a metallic jacket or other arrangement to lend tensile strength so that it can easily support container 10. In the embodiment of FIGS. 1 and 2, container 10 may be of relatively small size so that very little tensile strength is required of cable 24 and therefore dual-insulated conductors covered with a plastic jacket will suffice. In the arrangement of FIG. 5, the inner container 10 may be of relatively larger size so as to provide ample area for transportation of minnows, so cable 24 is provided with additional tensile strength parting characteristics. A bail (not shown) may be provided about neck 10A of the container as shown in FIG. 5 to facilitate lifting it into and out of the bucket 46. Such alternate arrangements are within the purview of this invention.

An additional feature of the alternate embodiment of the invention as shown in FIG. 5 is a means of providing floatation to container 10. A flotation ring 50 is positioned about neck portion 10A of container 10. The floatation ring 50 is held in place by lid 14 so that by removing the lid the ring may be removed when it is desired to use the container 10 for attracting fish. The flotation ring 50 may be of expanded polyurethane foam, cork, balsa wood, or any material having floating characteristics. Although not illustrated it can be seen that floatation ring 50 may be held in place by a supplemental flange screwed on neck portion 10A below lid 14 permitting lid 14 to be removed without removing the flotation ring.

While the invention has been described with a certain degree of particularity it is manifest that many changes may be made in the details of construction and the arrangement of components without departing from the spirit and the scope of this disclosure. It is understood that the invention is not to be limited by the abstract herein, nor the embodiments illustrated and described for purposes of exemplifying the invention, but the invention is to be limited only by the full range of equivalency to which each element thereof is entitled.

What is claimed:

1. A fish-attracting device comprising:
    a transparent container closed at the bottom and open at the top, the container being of a size to receive one or more minnows therein and having holes therein permitting the circulation of water therethrough;
    a removable lid receivable on said container for closing the same;
    an electrically energizable light bulb supported to the interior of said lid and extending, when said lid is in closed position on said container, into said container;
    a cable having the lower end thereof affixed to said lid, the cable including conductor portions connected to said light bulb, the cable serving as a means of lowering the said lid and container affixed thereto into water;
    a battery having electrical connectors, said conductor portions of said cable being affixed to the battery connectors whereby said light bulb is energized, and a sound-generator device affixed to the said lid, said sound-generator device having electrical connection with said cable conductor portions in parallel with said light bulb.

2. A fish-attracting device according to claim 1 wherein said sound generator emits, when energized, a sound having a fundamental frequency of between 160 and 610 cycles per second.

3. A fish-attracting device according to claim 1 wherein said battery has spaced upstanding threaded connectors thereon providing voltage therebetween, and including:
    a cable reel including a cylindrical portion and a flat, larger diameter flange portion at each end thereof, one of said flange portions having spaced openings therein receiving said threaded upstanding battery connectors, said conductor portions of said cable having electrical engagement with said connectors, said cable being stored by winding on said reel when the fish attracting device is not in use; and
    a nut threadably received on each of said battery connectors retaining said reel on said battery.

4. A fish-attracting device according to claim 3 including:
    a switch affixed to the said reel flange portion opposite the said flange portion receiving said battery connectors, said switch being connected in electrical series with one of said cable conductor portions whereby said light bulb may be turned on and off.

5. A fish-attracting device according to claim 1 including:
    a transparent, closed bottom, opened top, inner container of less diameter and length than said first-mentioned container, the inner container having a threaded top;
    an inner threaded lid affixed to the inner surface of said first mentioned lid, the inner lid threadably receiving said inner container whereby said inner container is made waterproof, said light bulb being supported to the interior of said inner lid and being encompassed by said inner container, said conductor portions of said cable extending sealably through said lids.

6. A fish-attracting device according to claim 5 including:
    a sound-generating device affixed to the interior surface of said inner threaded lid and encompassed within said inner container, said sound-generating device having electrical connection with said cable conductor portions in parallel with said light bulb.

7. A fish-attracting device according to claim 6 wherein said sound-generating device, when energized, emits a sound having a fundamental frequency of between 160 and 610 cycles per second.

8. A fish-attracting device according to claim 1 including:

a bucket of a size to receive said transparent container therein, said bucket being adaptable to hold water whereby said container and bucket serve as a means of transporting live bait, such as minnows or the like.

9. A fish-attracting device according to claim 1 wherein said container includes a reduced diameter neck portion, and including:

a ring of floatation material removably affixed to said neck portion of said container, said ring being of sufficient volume to float said container.

References Cited

UNITED STATES PATENTS

| | | | |
|---|---|---|---|
| 1,192,001 | 7/1916 | Ryan | 43—17.5 |
| 2,757,475 | 8/1956 | Pankove | 43—17.1 |
| 3,079,721 | 3/1963 | Smith | 43—17.5 |
| 3,091,882 | 6/1963 | Dudley | 43—17.5 |
| 3,177,604 | 4/1965 | Ewing | 43—17.5 |
| 3,235,999 | 2/1966 | Wieszeck | 43—17.1 |

SAMUEL KOREN, Primary Examiner

D. J. LEACH, Assistant Examiner

U.S. Cl. X.R.

43—17.5, 41, 56